United States Patent
Mittal et al.

(10) Patent No.: US 11,477,049 B2
(45) Date of Patent: Oct. 18, 2022

(54) LOGICAL TRANSPORT OVER A FIXED PCIE PHYSICAL TRANSPORT NETWORK

(71) Applicant: Xilinx, Inc., San Jose, CA (US)

(72) Inventors: Millind Mittal, Saratoga, CA (US); Kiran S. Puranik, Fremont, CA (US); Jaideep Dastidar, San Jose, CA (US)

(73) Assignee: XILINX, INC., San Jose, CA (US)

( * ) Notice: Subject to any disclaimer, the term of this patent is extended or adjusted under 35 U.S.C. 154(b) by 0 days.

(21) Appl. No.: 16/053,384

(22) Filed: Aug. 2, 2018

(65) Prior Publication Data
US 2020/0044895 A1 Feb. 6, 2020

(51) Int. Cl.
*H04L 12/54* (2022.01)
*H04L 69/22* (2022.01)
*H04L 12/70* (2013.01)

(52) U.S. Cl.
CPC .......... *H04L 12/5601* (2013.01); *H04L 69/22* (2013.01); *H04L 2012/566* (2013.01); *H04L 2012/5651* (2013.01)

(58) Field of Classification Search
CPC ................. H04L 12/5601; H04L 69/22; H04L 2012/5651; H04L 2012/566
See application file for complete search history.

(56) References Cited

U.S. PATENT DOCUMENTS

| | | | |
|---|---|---|---|
| 2005/0144339 A1* | 6/2005 | Wagh | H04L 69/12 710/36 |
| 2007/0019677 A1* | 1/2007 | Wang | G06F 13/385 370/469 |
| 2008/0082708 A1* | 4/2008 | Wong | G06F 13/37 710/111 |
| 2013/0346666 A1* | 12/2013 | Chang | G06F 13/20 710/313 |
| 2016/0041936 A1 | 2/2016 | Lee et al. | |
| 2016/0147442 A1* | 5/2016 | Baderdinni | G06F 3/0679 711/105 |

(Continued)

FOREIGN PATENT DOCUMENTS

WO WO-2015099730 A1 7/2015

OTHER PUBLICATIONS

David Koenen et al: "United States: Cadence Introduces First Interface and Verification IP solution for CCIX to Advance New Class of Datacenter Servers" Mena Report, May 5, 2017, XP055483333, London. Retrieved from teh the Internet: URL:http://www.armtechform.com./attached/article/c7_ccix20171226161995.pdf pp. 11-p. 15.

*Primary Examiner* — Un C Cho
*Assistant Examiner* — Yu-Wen Chang
(74) *Attorney, Agent, or Firm* — Patterson + Sheridan, LLP

(57) ABSTRACT

A method and a system for transparently overlaying a logical transport network over an existing physical transport network is disclosed. The system designates a virtual channel located in a first transaction layer of a network conforming to a first network protocol. The system assembles a transaction layer packet in a second logical transaction layer of a second network protocol that is also recognizable by the first transaction layer. The system transfers the transaction layer packet from the second transaction layer to the virtual channel. The system transmits the transaction layer packet over the first transaction layer using the designated virtual channel over the network.

17 Claims, 9 Drawing Sheets

(56) References Cited

U.S. PATENT DOCUMENTS

| | | |
|---|---|---|
| 2017/0068626 A1 | 3/2017 | Lais et al. |
| 2017/0068637 A1* | 3/2017 | Lais .................... G06F 13/4295 |
| 2018/0287964 A1* | 10/2018 | Gray ................... G06F 13/4282 |
| 2019/0004990 A1* | 1/2019 | Van Doren ......... G06F 13/4234 |
| 2019/0042455 A1* | 2/2019 | Agarwal ............. G06F 12/0815 |
| 2019/0042511 A1* | 2/2019 | Nachimuthu ....... G06F 13/1684 |
| 2019/0065426 A1* | 2/2019 | Das Sharma ....... G06F 13/4027 |
| 2019/0102292 A1* | 4/2019 | Agarwal ................. G06F 12/06 |
| 2019/0155760 A1* | 5/2019 | Chang ..................... G06F 13/16 |
| 2019/0297015 A1* | 9/2019 | Marolia .............. G06F 12/1081 |
| 2021/0075540 A1* | 3/2021 | Lu ........................ H04L 1/0057 |

\* cited by examiner

LOGICAL TRANSPORT OVER A FIXED PCIE PHYSICAL TRANSPORT NETWORK

TECHNICAL FIELD

Examples of the present disclosure generally relate to bus architectures of computing systems and, in particular, to transparently overlaying a logical transport network over an existing physical transport network.

BACKGROUND

Personal computer and server architectures have employed bus systems that have grown increasingly sophisticated with time. The Peripheral Component Interconnect (PCI) bus presented a number of advantages over previous bus implementations. Among the most important were processor independence, buffered isolation, bus mastering, and true plug-and-play operation. Buffered isolation essentially isolates, both electrically and by clock domains, the central processing unit (CPU) local bus from the PCI bus. Plug-and-play operation, which permits devices to be automatically detected and configured, eliminated the manual setting of switches and jumpers for base address and direct memory access (DMA) interrupts that frustrated Industry Standard Architecture (ISA)-based board users.

Although PCI has enjoyed great success, it faces a series of challenges, including bandwidth limitations, host pin-count limitations, the lack of real-time data transfer services such as isochronous data transfers, and the lack of features to meet next-generation input/output (I/O) requirements such as quality of service, power management, cache coherency, and I/O virtualization. Next-generation I/O requirements such as quality of service measurements and power management improve data integrity and permit selective powering down of system devices—an important consideration as the amount of power require by modern PCs continues to grow. Some of these features require software control beyond traditional PCI requirements and are not available until OS and device driver support is available.

Peripheral Component Interface Express (PCIe) has filled in many of the gaps in traditional PCI implementations, but PCIe has certain limitations in terms of command features, routing, and lack of cache coherency. Protocols with load/store or coherency semantics typically require same-address ordering between operations/events to that address location, regardless of the source of the device performing the load/store, in order to maintain functional correctness. Cache coherence is the uniformity of shared resource data that is stored in multiple local caches. When clients in a system maintain caches of a common memory resource, problems may arise with incoherent data, which is particularly the case with CPUs in a multiprocessing system.

One option to overcome the lack of load/store or cache coherency semantics in a PCIe bus-based architecture would be to replace all hardware and software related to the PCIe bus with a cache coherent bus architecture having the same or additional advantages as PCIe bus. However, full replacement of hardware is expensive, time consuming, and prone to error.

Therefore, it is desirable to provide a cache coherent bus architecture that can in-part be overlaid on an existing bus architecture without replacing all of the physical layer hardware of the underlying bus structure.

SUMMARY

Techniques for transparently overlaying a logical transport network over an existing physical transport network are disclosed. In an example, a computing system designates a virtual channel located in a first transaction layer of a network conforming to a first network protocol. The computer system assembles a transaction layer packet in a second logical transaction layer of a second network protocol that is also recognizable by the first transaction layer. The computer system transfers the transaction layer packet from the second transaction layer to the virtual channel. The computer transmits the transaction layer packet over the first transaction layer using the designated virtual channel over the network.

In another example, a computer system receives a transaction layer packet located in a first transaction layer of a network conforming to a first network protocol. The computer system extracts the transaction layer packet from a virtual channel located in the first transaction layer that is designated for use by a second logical transaction layer that conforms to a second network protocol. The computer system assembles a transaction layer packet that conforms to the second network protocol recognizable to the second logical transaction layer. The computer system transfers the transaction layer packet from the virtual channel to the second transaction layer.

These and other aspects may be understood with reference to the following detailed description.

BRIEF DESCRIPTION OF THE DRAWINGS

So that the manner in which the above recited features can be understood in detail, a more particular description, briefly summarized above, may be had by reference to example implementations, some of which are illustrated in the appended drawings. It is to be noted, however, that the appended drawings illustrate only typical example implementations and are therefore not to be considered limiting of its scope.

To facilitate understanding, identical reference numerals have been used, where possible, to designate identical elements that are common to the figures. It is contemplated that elements of one example may be beneficially incorporated in other examples.

DETAILED DESCRIPTION

Figure 1:
FIG. 1 is a block diagram depicting a system for transparently overlaying a logical transport network over an existing physical transport network, according to an example

Various features are described herein with reference to the figures. It should be noted that the figures may or may not be drawn to scale and that the elements of similar structures or functions are represented by like reference numerals throughout the figures. It should be noted that the figures are only intended to facilitate the description of the features. They are not intended as an exhaustive description of the claimed invention or as a limitation on the scope of the claimed invention. In addition, an illustrated example need not have all the aspects or advantages shown. An aspect or an advantage described in conjunction with a particular example is not necessarily limited to that example and can be practiced in any other examples even if not so illustrated or if not so explicitly described.

Techniques for transparently overlaying a logical transport network over an existing physical transport network are disclosed. The combined logical/physical transport network leverages existing properties of the physical transport, but also includes class of service (COS) attributes that are unique to that logical transport network that not available natively over the physical transport network. In one example, the physical transport network and protocol may be, but is not limited to, the Peripheral Component Interconnect Express (PCIe) network. The PCIe protocol stack includes an embedded physical layer and data link layer. In one example, the logical transport network may include, but is not limited to, the transport layer of the Cache Coherence Interconnect for Accelerators (CCIX) protocol. The techniques described herein designate a PCIe virtual channel (VC) for logical transport of CCIX messages. The techniques create Class-of-Service attributes for the logical transport network that are transparently carried over the PCIe physical transport layer, via PCIe third party messages known as Vendor Defined Messages (VDMs). The techniques create optimized transaction layer packets (TLP), different from the PCIe standard TLP, carried only over the designated VC. The optimized TLPs contain low-latency and protocol attributes that are specific to the overlaid logical transport network.

Examples of the preset disclosure leverage available PCIe mechanisms that satisfy the requirements of the CCIX logical transport. The CCIX logical transport attributes are overlaid on PCIe defined mechanisms located in its physical electrical and physical logical layers, its data link layer, and its transaction layer with VDMs. The CCIX Packet definition, different from the PCIe TLP Packet definition, is overlaid on to PCIe VDMs of the transaction layer, and the CCIX property of in-order packet delivery is also achieved via the PCIe TLP property of in—order delivery of VDMs.

Examples of the present disclosure define new mechanisms, when those mechanisms are needed for the logical transport, but not available natively on the physical transport. This mechanism involves designating a PCIe Virtual Channel (VC) where PCIe VDMs on that VC contain properties unique to the CCIX logical transport. The properties include Class of Service attributes, and CCIX virtual channels transported within that designated PCIe virtual channel. The CCIX functions derived from those properties are available universally over devices connected via the PCIe transaction layer, since these VDMs are transparently carried over PCIe.

Examples of the present disclosure further permit the creation of optimized transaction layer packets (TLP), different from the PCIe standard TLP, that are carried only from one device with that designated VC to another device with that same designated VC. The optimized TLP contain low-latency and protocol attributes that are specific to CCIX.

FIG. 1 is a block diagram depicting a system 100 for transparently overlaying a logical transport network over an existing physical transport network, according to an example. The system 100 includes a computer system 102. The computer system 102 includes a hardware platform ("hardware 104") and a software platform ("software 106") executing on the hardware 104. The hardware 104 includes a processing system 110, system memory 116, storage devices ("storage 118"), and a peripheral device 122. The software 106 includes an operating system (OS) 144, device drivers 146, and applications 150. The OS 144 is configured to implement a combined CCIX/PCIe protocol stack 152 configured to implement the CCIX transaction layer over the PCIe data link layer and physical layer according to embodiments.

The processing system 110 further includes a microprocessor 112, support circuits 114, and a peripheral bus 115. The microprocessor 112 can be any type of general-purpose central processing unit (CPU), such as an x86-based processor, ARM®-based processor, or the like. The microprocessor 112 can include one or more cores and associated circuitry (e.g., cache memories, memory management units (MMUs), interrupt controllers, etc.). The microprocessor 112 is configured to execute program code that perform one or more operations described herein and which can be stored in the system memory 116 and/or the storage 118. The support circuits 114 include various devices that cooperate with the microprocessor 112 to manage data flow between the microprocessor 112, the system memory 116, the storage 118, the peripheral device 122, or any other peripheral device. For example, the support circuits 114 can include a chipset (e.g., a north bridge, south bridge, platform host controller, etc.), voltage regulators, firmware (e.g., a BIOS), and the like. The support circuits 114 manage data flow between the microprocessor 112 and the peripheral bus 115, to which various peripherals, such as the peripheral device 122, are connected. In some examples, the microprocessor 112 can be a System-in-Package (SiP), System-on-Chip (SoC), or the like, which absorbs all or a substantial portion of the functionality of the chipset (e.g., north bridge, south bridge, etc.). The peripheral bus can implement an expansion bus standard, such as Peripheral Component Interconnect Express (PCIe). In the example, the processing system 110 is shown separate from the peripheral device 122. In other examples discussed further below, the processing system 110 and the peripheral device 122 can be implemented on the same integrated circuit (IC).

The system memory 116 is a device allowing information, such as executable instructions and data, to be stored and retrieved. The system memory 116 can include, for example, one or more random access memory (RAM) modules, such as double-data rate (DDR) dynamic RAM (DRAM). The storage 118 includes local storage devices (e.g., one or more hard disks, flash memory modules, solid state disks, and optical disks) and/or a storage interface that enables the computer system 102 to communicate with one or more network data storage systems. The hardware 104 can include various other conventional devices and peripherals of a computing system, such as graphics cards, universal serial bus (USB) interfaces, and the like.

The peripheral device 122 includes a programmable IC 128, a non-volatile memory 124, and RAM 126. The programmable IC 128 can be a field programmable gate array (FPGA) or the like or an SoC having an FPGA or the like. The NVM 124 can include any type of non-volatile memory, such as flash memory or the like. The RAM 126 can include DDR DRAM or the like. The programmable IC 128 is coupled to the NVM 124 and the RAM 126. The programmable IC 128 is also coupled to the peripheral bus 115 of the processing system 110. The programmable IC 128 may further include PCIe circuit logic 130A implementing the physical layer of the peripheral bus 115, and include CCIX custom logic 130B for implementing hardware features specific to CCIX transport protocol aware devices, such as the peripheral device 122, and for implementing CCIX firmware 119.

The OS 144 can be any commodity operating system known in the art. The drivers 146 include drivers and libraries that provide application programming interfaces (APIs) to the peripheral device 122 for command and control thereof. The applications 150 include software executing on the microprocessor 112 that invokes the peripheral device 122 through the combined CCIX/PCIe protocol stack 152 to transmit CCIX/PCIe attributes and transaction layer packets (TLPs). The applications 150 can include neural network, video processing, network processing, or the like type applications that offload some functions to the peripheral device 122.

The CCIX architecture specification comprises five discrete logical layers. These include a CCIX protocol layer, a CCIX link layer, and the CCIX transaction layer. The CCIX transaction layers, data link and physical layers together are referred to as CCIX transport. The CCIX architectural specification also includes the PCIe transaction layer, PCIe data link layer and PCIe physical layer. Each of these layers is divided into two sections: one that processes outbound (to be transmitted) information and one that processes inbound (received) information.

Figure 2:
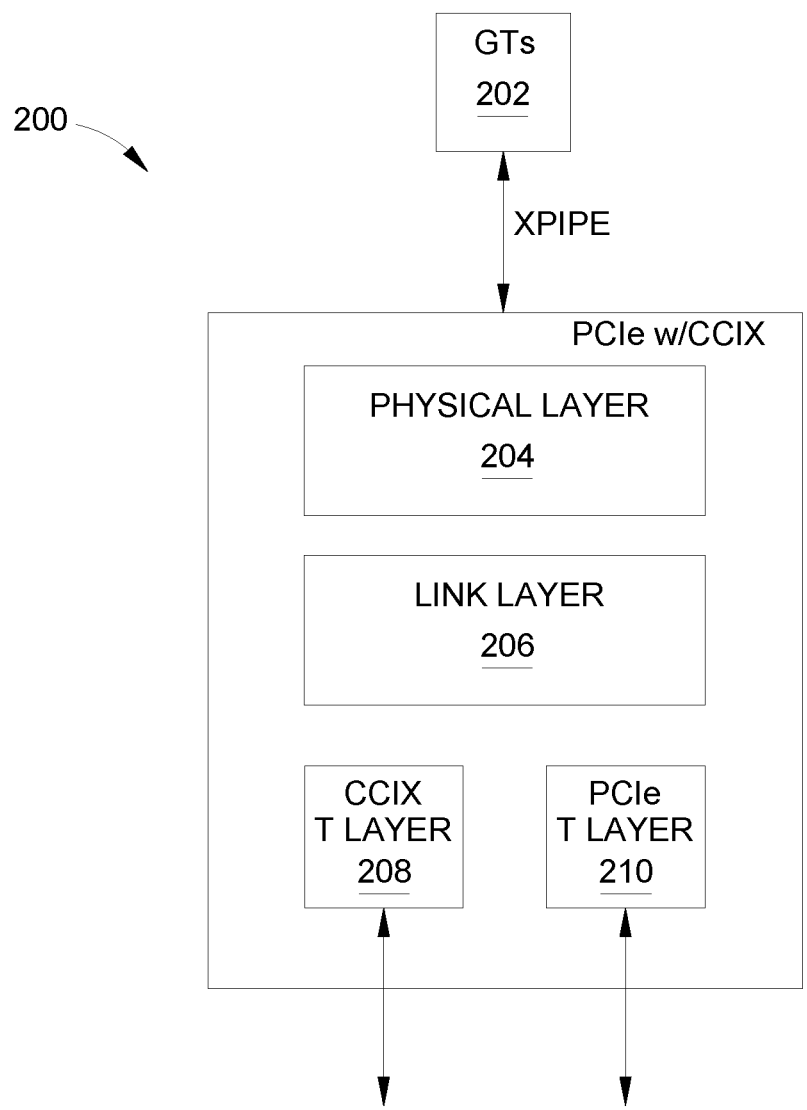
FIG. 2 shows a PCIe device with CCIX functionality which permits the PCIe device to have load/store and coherency semantics over PCIe.

FIG. 2 shows a PCIe device 200 with CCIX functionality that permits the PCIe device 200 to have load/store and coherency semantics over PCIe. The PCIe device 200 is coupled to one or more gigabit transceivers (GTs) 202. The PCIe device 200 retains the PCIe physical layer 204 and the PCIe data link layer 206, but permits the PCIe transaction layer 210 to exist alongside with the CCIX transaction layer 208 so that CCIX-aware devices can employ features of the CCIX transport. The CCIX specification does not modify the PCIe transaction layer 210. The primary responsibility of the PCIe transaction layer 210 is the assembly and disassembly of transaction layer packets (TLPs). TLPs are used to communicate transactions (e.g., read, write), as well as certain types of events. The PCIe transaction layer 210 is also responsible for managing credit-based flow control for TLPs. The CCIX specification does not modify the PCIe data link layer 206 and the PCIe physical layer 204 and utilizes it as is. The PCIe data link layer 206 functions as an intermediate stage between the PCIe transaction layer 210 and the CCIX transaction layer 208. The primary responsibilities of the PCIe data link layer 206 include link management and data integrity, including error detection and error correction.

The technique of transparently overlaying a logical transport network over an existing physical transport (e.g., PCIe) defines a new transaction layer, e.g., the CCIX transaction layer 208. The CCIX transaction layer 208 replaces the PCIe transaction layer 210 in one of the PCIe Virtual Channels (VCs) in a multi-VC implementation. The CCIX transaction layer 208 is a reduced PCIe transaction layer which supports optimized CCIX-compatible TLPs and PCIe-compatible TLPs.

The CCIX Transaction Layer's primary responsibility is the assembly and disassembly of CCIX Transaction Layer Packets (TLPs). On a receive path, the CCIX transaction layer 208 checks CCIX TLP integrity, before forwarding the TLP to the PCIe data link layer 206. For PCIe Compatible TLPs, the PCIe transaction layer 210 checks specified in the PCI Express Base Specification are applicable. For Optimized TLPs, a new set of CCIX Transaction Layer checks are specified.

The CCIX transaction layer 208 is also responsible for managing credit-based flow control for CCIX TLPs. On the receive path, posted flow control credits are returned for CCIX TLPs that pass data integrity checks and are forwarded to the CCIX transaction layer 208. In the transmit path, a credit gate is implemented to control flow of CCIX TLPs based on available posted credit. These posted credits are defined on a link-wide basis.

CCIX uses transaction layer packets (TLPs) to communicate information over the PCIE data link layer 206 and physical layer 204. As the transmitted packets flow downstream through CCIX transaction layer 208, the PCIE data link layer 206, and the PCIe physical layer 204, the CCIX packets are extended with additional information necessary to handle packets at each of the aforementioned layers. At a receiving side, a reverse process occurs and packets are transformed from a PCIe physical layer 204 representation to a PCIE data link layer 206 representation and finally (for transaction layer packets) to the form that can be processed by the CCIX transaction layer 208 of the receiving device.

CCIX transport is over a designated PCIe virtual channel. The designated VC enables performance isolation from other PCIe traffic and also prevents resource dependency deadlocks with other PCIe traffic. CCIX protocol messages are transmitted via third party PCIe vendor defined messages (VDMs). PCIe VDMs leverage an ordering properties of VDMs and the performance property of VDMs being a posted, i.e., fire & forget, transaction. A sender does not need to wait for a packet to be acknowledged and can also rely on the PCIe ordered network delivering multiple VDMs in temporal order. With a designated virtual channel for CCIX traffic, the CCIX transaction layer 208 can be designated. Traffic appearing over PCIe transport bifurcates to the CCIX transaction layer 208 or the PCIe transaction layer 210, depending on whether the traffic is on the CCIX or non-CCIX VC. This offers latency and bandwidth advantages, which are important to load/store and coherency protocols in general. Also, a CCIX transaction layer 208 that is independent of PCIe also offers latency and performance advantages by permitting features not available in the PCIe transaction layer—this includes CCIX request chaining and CCIX message packing.

Figure 3:
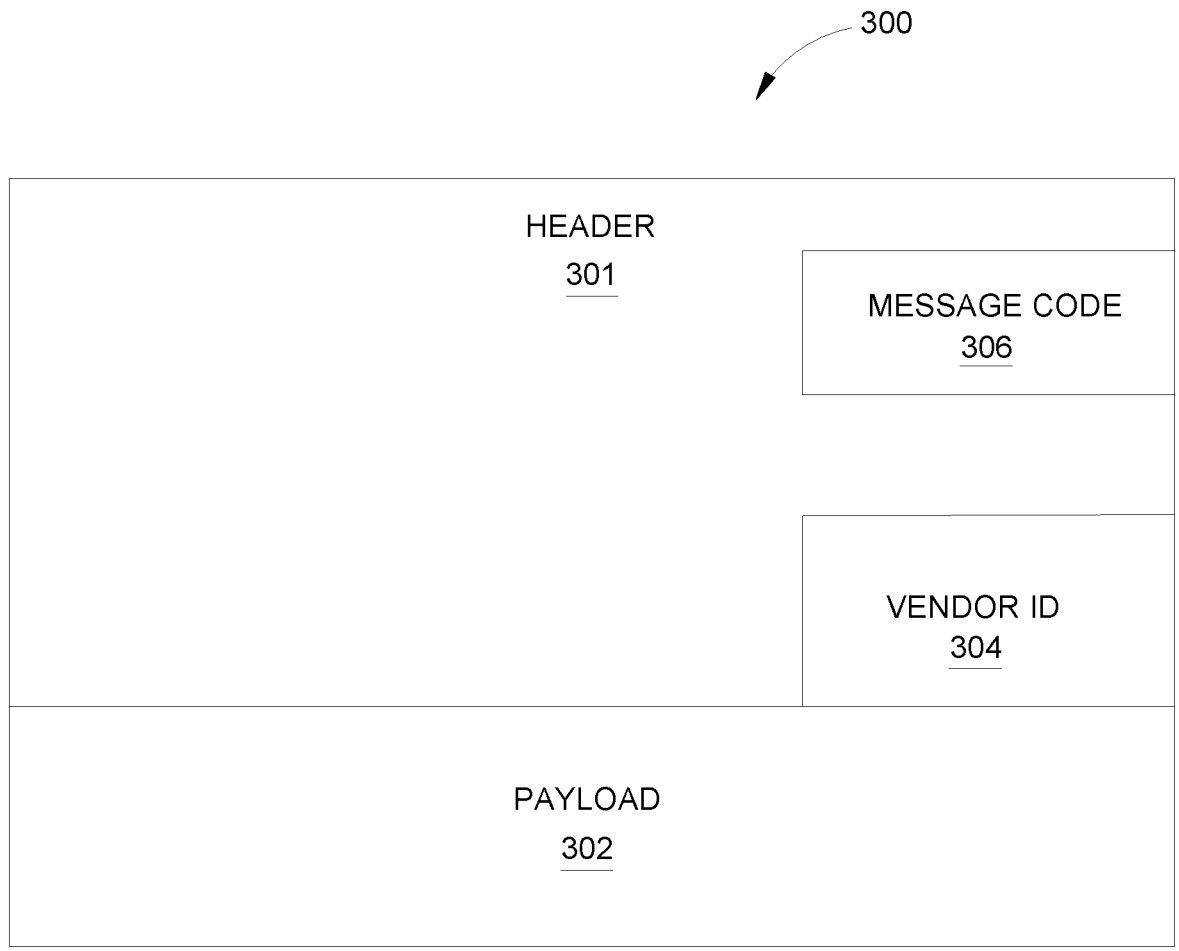
FIG. 3 shows a layout of a PCIe packet.

FIG. 3 shows a layout of a PCIe/TLP packet 300. The PCIe/TLP packet 300 includes at least a payload 302, a vendor ID (vendor-specific identifier) field 304, and a message code field 306. The OS 144 creates and employs a PCIe virtual channel for handling packet traffic between devices. Once CCIX vendor defined VDMs are detected by the OS 144, the CCIX firmware 119 enables a PCIe virtual channel in the CCIX transaction layer 208 that is not known to the PCIe transaction layer 210. Once the CCIX custom logic 130B discovers the enablement of the CCIX-designated PCIe virtual channel, the CCIX custom logic 130B proceeds to discover whether PCIe packets located in the combined CCIX/PCIe protocol stack 152 contain vendor defined messages in its packets that are recognizable to CCIX-based devices. PCIe is configured to recognize an existing third party vendor identifier (ID) and a third party packet type within its protocol called a vendor defined message. CCIX uses vendor defined messages that every CCIX-based device from any vendor of CCIX can recognize and employ in communication. The PCIe transaction layer 210 recognizes PCIe attributes on the CCIX virtual channel, and is unaware that these attributes are designated as CCIX attributes that extend the capabilities of PCIe.

FIG. 3 shows a layout of a PCIe/TLP packet 300. The PCIe/TLP packet 300 includes a header 301 and a payload 302. Referring to FIGS. 1 and 3, CCIX-aware firmware 119 detects in a PCIE compatible TLP packet 300 having a vendor-specific identifier called a vendor ID 304 in the header 301. The CCIX firmware 119 then examines a message code field 306 in the header 301 that identifies the packet as a vendor defined message. In response to detecting the CCIX header 301 containing a VDM associated with CCIX-communication, the CCIX-aware firmware 219 examines the content of the CCIX-based header 301 of a CCIX TLP embedded within the TLP packet 300 to determine how to process the CCIX packet. The CCIX firmware 219 then informs the CCIX-aware OS 144 that information contained in the VDM is associated with a CCIX-aware application, and that the CCIX-aware OS 144 should expect to process one or more CCIX-type TLPs received over the CCIX transaction layer 208.

CCIX further employs a software data structure, that is a counterpart to the vendor defined message, called Designated Vendor-Specific Expended Capabilities (DVSEC). This DVSEC software data structure is device vendor-specific. When the OS 144 recognizes a DVSEC vendor defined message identifier, the OS 144 recognizes that accompanying DVSEC packet has additional attributes not recognizable by PCIe. The OS 144 then consults the CCIX-aware firmware 119 to interpret the DVSEC attribute and packet. Thus, the PCIe portion of the OS 144 is made aware that it needs to handle CCIX packets, but remains unaware how to interpret the packet's embedded attributes. The OS 144 then forwards the DVSEC message to the CCIX transaction layer 208 of the combined CCIX/PCIe protocol stack 152 and the CCIX firmware 119 for further interpretation.

Figure 4:
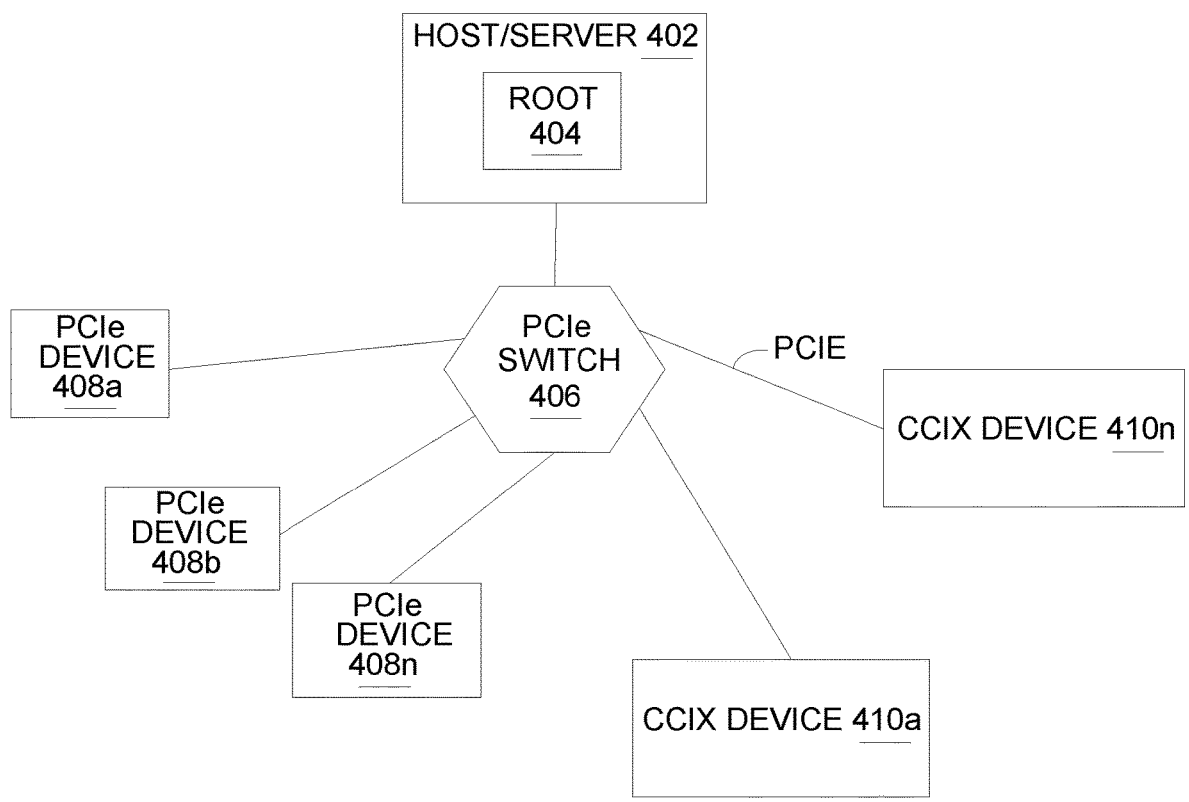
FIG. 4 is a block diagram of a PCIe network having a tree topology.

FIG. 4 is a block diagram of a PCIe network 400 having a tree topology. The PCIe network 400 includes a host/server 402 that includes a PCIe root port 404 connected to a PCIe switch 406, which communicates with a set of PCIe devices 408a-408n and a plurality of CCIX-aware devices 410a-410n. Traffic that is to travel from one CCIX device (e.g., 410a) to another CCIX device (e.g., 410n) using VDMs over a virtual channel needs to traverse the PCIe switch 406 before travelling to a requested destination.

The messages sent between PCIe devices 408a-408n are substantially point-to-point messages. However, CCIX-aware devices 410a-410n have a number of extended capabilities not found in traditional PCIe devices. For example, the device 410a can send a TLP with a VDM having the address of the device 410n. Once the TLP message is transported through the PCIe switch 406 to the destination device 410n, the device 410n can further interpret the received VDM with enhanced capabilities. One type of enhanced capabilities is that the VDM may contain instructions to transmit the received message to further CCIX-aware devices in the network 400 (not shown). The PCIe transaction layer 210 is unaware of this further transmission.

Figure 5:
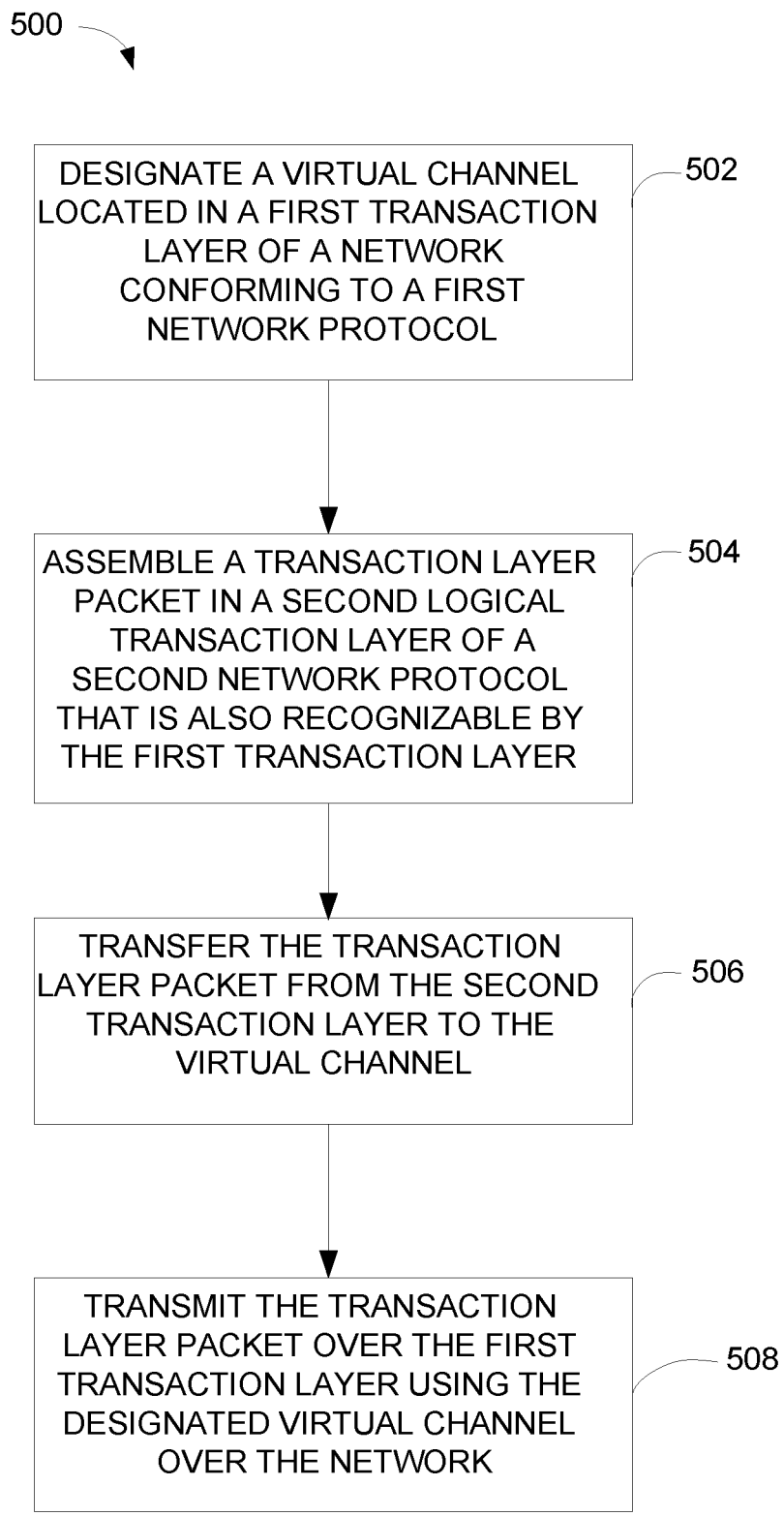
FIG. 5 is a flow diagram depicting a first method for transparently overlaying a logical transport network over an existing physical transport network according to an example.

FIG. 5 is a flow diagram depicting a first method 500 for transparently overlaying a logical transport network over an existing physical transport network according to an example. Aspects of the method 500 may be understood with reference to FIGS. 1-4. The method 500 begins at block 502, where computer system 102 designates a virtual channel located in a first transaction layer of a network conforming to a first network protocol. At block 504, the computer system 102 assembles a transaction layer packet in a second logical transaction layer of a second network protocol that is also recognizable by the first transaction layer. At least one attribute contained within the transaction layer packet is not recognizable to the first transaction layer, but remaining fields of the packet are recognizable by the first transaction layer. The remaining fields of the packet are unique to the second logical transaction layer.

In an example, the transaction layer packet includes a third party identifier recognizable to the first transaction layer, and a third party message type and a third-party header recognizable to the second logical transaction layer. At block 506, the computer system 102 transfers the transaction layer packet from the second transaction layer to the virtual channel. At block 508, the computer system 102 transmits the transaction layer packet over the first transaction layer using the designated virtual channel over the network. In an example, the first transaction layer transmits the transaction layer packet over a data link layer and a physical layer that conforms to the first network protocol.

In an example, the second transaction layer leverages existing properties of the physical layer, but employs class of service (COS) attributes that are unique to the second logical transaction layer. The COS attributes are at least one of low latency attributes and protocol attributes.

In an example, the second network protocol is cache coherent. In an example, the first network protocol is the PCIe protocol and the second network protocol is the CCIX protocol.

Figure 6:
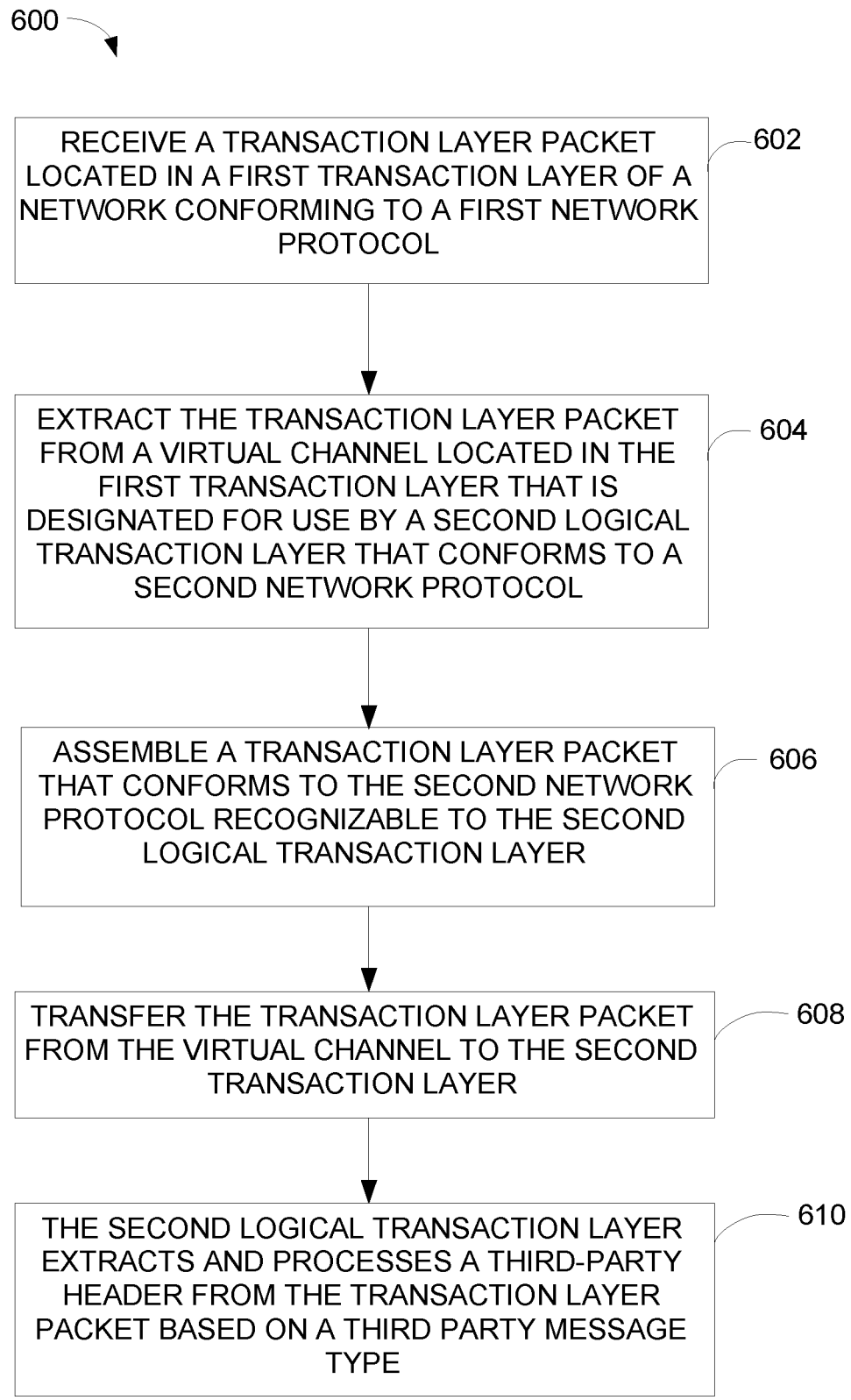
FIG. 6 is a flow diagram depicting a method for transparently overlaying a logical transport network over an existing physical transport network according to an example.

FIG. 6 is a flow diagram depicting a second method 600 for transparently overlaying a logical transport network over an existing physical transport network according to an example. Aspects of the method 600 may be understood with reference to FIGS. 1-4. The method 600 begins at block 602, where computer system 102 receives a transaction layer packet located in a first transaction layer of a network conforming to a first network protocol. At block 604, the computer system 102 extracts the transaction layer packet from a virtual channel located in the first transaction layer that is designated for use by a second logical transaction layer that conforms to a second network protocol. At least one attribute contained within the transaction layer packet is not recognizable to the first transaction layer, but remaining fields of the packet are recognizable by the first transaction layer. The remaining fields of the packet are unique to the second logical transaction layer.

In an example, the transaction layer packet includes a third party identifier recognizable to the first transaction layer, and a third party message type and a third-party header recognizable to the second logical transaction layer. At block 606, the computer system 102 assembles a transaction layer packet that conforms to the second network protocol recognizable to the second logical transaction layer. At block 608, the computer system 102 transfers the transaction layer packet from the virtual channel to the second transaction layer.

In an example, the transaction layer packet includes a third party identifier recognizable to the first transaction layer, and a third party message type and a third-party header recognizable to the second logical transaction layer. At block 610, the second logical transaction layer of the computer system 102 extracts and processes the third-party header from the transaction layer packet based on the third party message type.

In an example, the second transaction layer leverages existing properties of the physical layer, but employs class of service (COS) attributes that are unique to the second logical transaction layer. The COS attributes are at least one of low latency attributes and protocol attributes.

In an example, the second network protocol is cache coherent. In an example, the first network protocol is the PCIe protocol and the second network protocol is the CCIX protocol.

Figure 7:
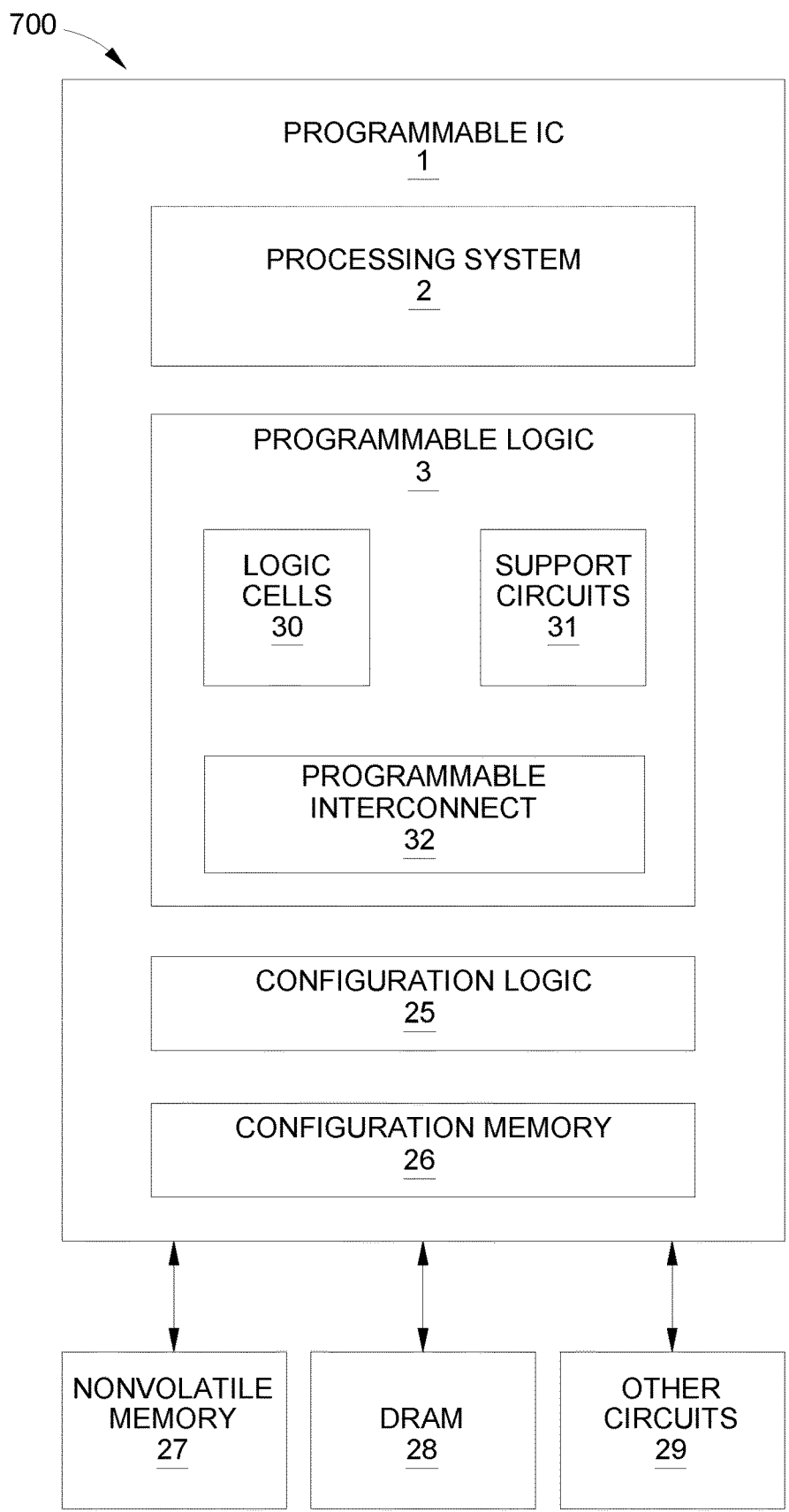
FIG. 7 is a block diagram depicting a programmable IC according to an example.

FIG. 7 is a block diagram depicting a programmable IC 1 according to an example. The programmable IC 1 includes programmable logic 3, configuration logic 25, and configuration memory 26. The programmable IC 1 can be coupled to external circuits, such as nonvolatile memory 27, DRAM 28, and other circuits 29. The programmable logic 3 includes logic cells 30, support circuits 31, and programmable interconnect 32. The logic cells 30 include circuits that can be configured to implement general logic functions of a plurality of inputs. The support circuits 31 include dedicated circuits, such as transceivers, input/output blocks, digital signal processors, memories, and the like. The logic cells and the support circuits 31 can be interconnected using the programmable interconnect 32. Information for programming the logic cells 30, for setting parameters of the support circuits 31, and for programming the programmable interconnect 32 is stored in the configuration memory 26 by the configuration logic 25. The configuration logic 25 can obtain the configuration data from the nonvolatile memory 27 or any other source (e.g., the DRAM 28 or from the other circuits 29). In some examples, the programmable IC 1 includes a processing system 2. The processing system 2 can include microprocessor(s), memory, support circuits, IO circuits, and the like.

Figure 8:
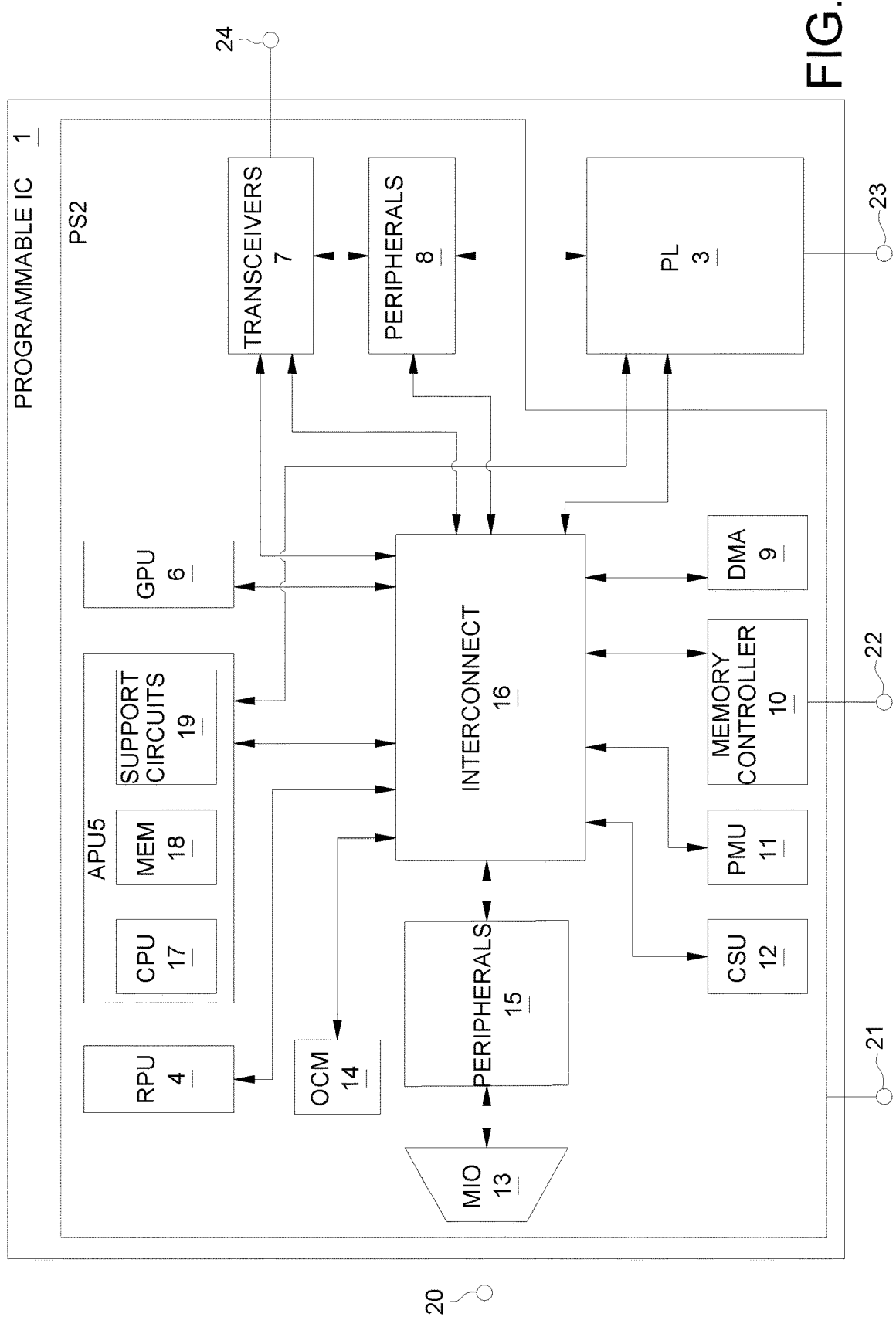
FIG. 8 is a block diagram depicting a System-on-Chip (SoC) implementation of a programmable IC according to an example.

FIG. 8 is a block diagram depicting a System-on-Chip (SoC) implementation of the programmable IC 1 according to an example. In the example, the programmable IC 1 includes the processing system 2 and the programmable logic 3. The processing system 2 includes various processing units, such as a real-time processing unit (RPU) 4, an application processing unit (APU) 5, a graphics processing unit (GPU) 6, a configuration and security unit (CSU) 12, a platform management unit (PMU) 122, and the like. The processing system 2 also includes various support circuits, such as on-chip memory (OCM) 14, transceivers 7, peripherals 8, interconnect 16, DMA circuit 9, memory controller 10, peripherals 15, and multiplexed IO (MIO) circuit 13. The processing units and the support circuits are interconnected by the interconnect 16. The PL 3 is also coupled to the interconnect 16. The transceivers 7 are coupled to external pins 24. The PL 3 is coupled to external pins 23. The memory controller 10 is coupled to external pins 22. The MIO 13 is coupled to external pins 20. The PS 2 is generally coupled to external pins 21. The APU 5 can include a CPU 17, memory 18, and support circuits 19.

In the example of FIG. 8, the programmable IC 1 can be used in the peripheral device 122 and can function as described above. The PCIe circuit logic 130A and the CCIX custom logic 130B can be programmed in the PL 3 and function as described above. In another example, the functionality of the hardware 104 described above can be implemented using the PS 2, rather than through hardware of a computing system. In such case, the software 106 executes on the PS 2 and functions as described above.

Referring to the PS 2, each of the processing units includes one or more central processing units (CPUs) and associated circuits, such as memories, interrupt controllers, direct memory access (DMA) controllers, memory management units (MMUs), floating point units (FPUs), and the like. The interconnect 16 includes various switches, busses, communication links, and the like configured to interconnect the processing units, as well as interconnect the other components in the PS 2 to the processing units.

The OCM 14 includes one or more RAM modules, which can be distributed throughout the PS 2. For example, the OCM 14 can include battery backed RAM (BBRAM), tightly coupled memory (TCM), and the like. The memory controller 10 can include a DRAM interface for accessing external DRAM. The peripherals 8, 15 can include one or more components that provide an interface to the PS 2. For example, the peripherals 15 can include a graphics processing unit (GPU), a display interface (e.g., DisplayPort, high-definition multimedia interface (HDMI) port, etc.), universal serial bus (USB) ports, Ethernet ports, universal asynchronous transceiver (UART) ports, serial peripheral interface (SPI) ports, general purpose IO (GPIO) ports, serial advanced technology attachment (SATA) ports, PCIe ports, and the like. The peripherals 15 can be coupled to the MIO 13. The peripherals 8 can be coupled to the transceivers 7. The transceivers 7 can include serializer/deserializer (SERDES) circuits, MGTs, and the like.

Figure 9:
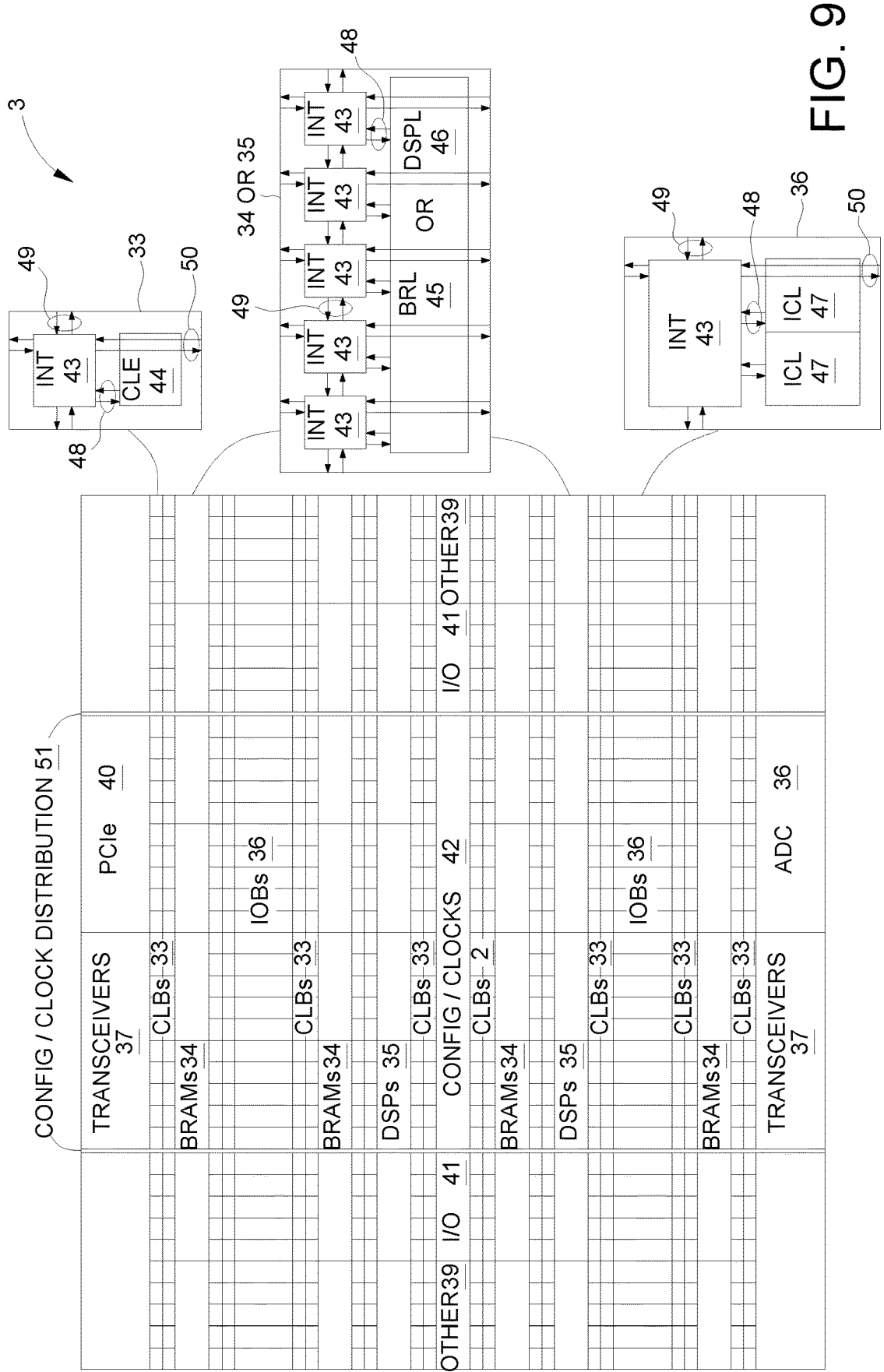
FIG. 9 illustrates a field programmable gate array (FPGA) implementation of a programmable IC according to an example.

FIG. 9 illustrates a field programmable gate array (FPGA) implementation of the programmable IC 1 that includes a large number of different programmable tiles including transceivers 37, configurable logic blocks ("CLBs") 33, random access memory blocks ("BRAMs") 34, input/output blocks ("IOBs") 36, configuration and clocking logic ("CONFIG/CLOCKS") 42, digital signal processing blocks ("DSPs") 35, specialized input/output blocks ("I/O") 41 (e.g., configuration ports and clock ports), and other programmable logic 39 such as digital clock managers, analog-to-digital converters, system monitoring logic, and so forth. The FPGA can also include PCIe interfaces 40, analog-to-digital converters (ADC) 38, and the like.

In some FPGAs, each programmable tile can include at least one programmable interconnect element ("INT") 43 having connections to input and output terminals 48 of a programmable logic element within the same tile, as shown by examples included at the top of FIG. 8. Each programmable interconnect element 43 can also include connections to interconnect segments 49 of adjacent programmable interconnect element(s) in the same tile or other tile(s). Each programmable interconnect element 43 can also include connections to interconnect segments 50 of general routing resources between logic blocks (not shown). The general routing resources can include routing channels between logic blocks (not shown) comprising tracks of interconnect segments (e.g., interconnect segments 50) and switch blocks (not shown) for connecting interconnect segments. The interconnect segments of the general routing resources (e.g., interconnect segments 50) can span one or more logic blocks. The programmable interconnect elements 43 taken together with the general routing resources implement a programmable interconnect structure ("programmable interconnect") for the illustrated FPGA.

In an example implementation, a CLB 33 can include a configurable logic element ("CLE") 44 that can be programmed to implement user logic plus a single programmable interconnect element ("INT") 43. A BRAM 34 can include a BRAM logic element ("BRL") 45 in addition to one or more programmable interconnect elements. Typically, the number of interconnect elements included in a tile depends on the height of the tile. In the pictured example, a BRAM tile has the same height as five CLBs, but other numbers (e.g., four) can also be used. A DSP tile 35 can include a DSP logic element ("DSPL") 46 in addition to an appropriate number of programmable interconnect elements. An 10B 36 can include, for example, two instances of an input/output logic element ("IOL") 47 in addition to one instance of the programmable interconnect element 43. As will be clear to those of skill in the art, the actual I/O pads connected, for example, to the I/O logic element 47 typically are not confined to the area of the input/output logic element 47.

In the pictured example, a horizontal area near the center of the die (shown in FIG. 10) is used for configuration, clock, and other control logic. Vertical columns 51 extending from this horizontal area or column are used to distribute the clocks and configuration signals across the breadth of the FPGA.

Some FPGAs utilizing the architecture illustrated in FIG. 8 include additional logic blocks that disrupt the regular columnar structure making up a large part of the FPGA. The additional logic blocks can be programmable blocks and/or dedicated logic.

Note that FIG. 9 is intended to illustrate only an exemplary FPGA architecture. For example, the numbers of logic blocks in a row, the relative width of the rows, the number and order of rows, the types of logic blocks included in the rows, the relative sizes of the logic blocks, and the interconnect/logic implementations included at the top of FIG. 9 are purely exemplary. For example, in an actual FPGA more than one adjacent row of CLBs is typically included wherever the CLBs appear, to facilitate the efficient implementation of user logic, but the number of adjacent CLB rows varies with the overall size of the FPGA.

While the foregoing is directed to specific examples, other and further examples may be devised without departing from the basic scope thereof, and the scope thereof is determined by the claims that follow.

What is claimed is:

1. A method, comprising:
designating a first virtual channel of a plurality of virtual channels located in a first logical transaction layer of a physical transport network conforming to a first network protocol;
assembling a transaction layer packet in a second logical transaction layer of a second network protocol, wherein the transaction layer packet conforms to the first network protocol and comprises a header conforming to the second network protocol and compatible with the first network protocol, wherein the header comprises a vender defined message (VDM) indicating to logic conforming to the second network protocol how to process the transaction layer packet,
wherein the VDM comprises a message containing instructions to a destination device of the transaction layer packet to re-transmit the transaction layer packet to a different device capable of recognizing the second network protocol, wherein the first logical transaction layer is unaware of the re-transmission;
transferring the transaction layer packet from the second logical transaction layer to the first virtual channel; and
transmitting, the transaction layer packet over a data link layer and a physical layer of the physical transport network using the first virtual channel, the data link layer and the physical layer conforming to the first network protocol.

2. The method of claim 1, wherein the transaction layer packet includes a third party identifier recognizable to the first logical transaction layer, and a third party message type recognizable to the second logical transaction layer.

3. The method of claim 1, wherein the second logical transaction layer leverages existing properties of the physical layer of the physical transport network, but employs class of service (COS) attributes that are unique to the second logical transaction layer.

4. The method of claim 3, wherein the COS attributes are at least one of low latency attributes and protocol attributes.

5. The method of claim 1, wherein at least one attribute contained within the transaction layer packet is not recognizable to the first logical transaction layer, but remaining fields of the transaction layer packet are recognizable by the first logical transaction layer.

6. The method of claim 1, wherein the second network protocol contains load/store semantics.

7. The method of claim 1, wherein the first network protocol is a PCIe protocol and the second network protocol is a CCIX protocol.

8. The method of claim 1, wherein the second logical transaction layer provides for in-order packet delivery.

9. A method, comprising:
receiving a first transaction layer packet via a data link layer and a physical layer of a physical transport network conforming to a first network protocol, wherein the first transaction layer packet conforms to the first network protocol and comprises:
a header conforming to a second network protocol and compatible with the first network protocol, wherein the header comprises a vender defined message (VDM) indicating to logic conforming to the second network protocol how to process the first transaction layer packet,
wherein the VDM comprises a message containing instructions to a destination device of the transaction layer packet to re-transmit the transaction layer packet to a different device capable of recognizing the second network protocol, wherein the first logical transaction layer is unaware of the re-transmission;
extracting the first transaction layer packet from a first virtual channel located in the data link layer, in the physical layer, and in a first logical transaction layer of the physical transport network;
assembling a second transaction layer packet that conforms to the second network protocol recognizable to a second logical transaction layer; and
transferring the second transaction layer packet from the first virtual channel to the second logical transaction layer.

10. The method of claim 9, wherein the transaction layer packet includes a third party identifier recognizable to the first logical transaction layer, and a third party message type recognizable to the second logical transaction layer.

11. The method of claim 10, further comprising extracting, by the second logical transaction layer, the header from the transaction layer packet based on the third party message type.

12. The method of claim 9, wherein the second logical transaction layer leverages existing properties of the physical layer, but employs class of service (COS) attributes that are unique to the second logical transaction layer.

13. The method of claim 12, wherein the COS attributes are at least one of low latency attributes and protocol attributes.

14. The method of claim 9, wherein at least one attribute contained within the transaction layer packet is not recognizable to the first logical transaction layer, but remaining fields of the first transaction layer packet are recognizable by the first logical transaction layer.

15. The method of claim 9, wherein the first network protocol is a PCIe protocol and the second network protocol is a CCIX protocol.

16. A system, comprising:
- a computer processor; and
- a memory coupled to the computer processor, the computer processor configured to execute code located in the memory for:
  - designating a first virtual channel of a plurality of virtual channels located in a first logical transaction layer of a physical transport network conforming to a first network protocol;
  - assembling a transaction layer packet in a second logical transaction layer of a second network protocol, wherein the transaction layer packet conforms to the first network protocol and comprises a header conforming to the second network protocol and compatible with the first network protocol, wherein the header comprises a vender defined message (VDM) indicating to logic conforming to the second network protocol how to process the transaction layer packet,
  - wherein the VDM comprises a message containing instructions to a destination device of the transaction layer packet to re-transmit the transaction layer packet to a different device capable of recognizing the second network protocol, wherein the first logical transaction layer is unaware of the re-transmission;
  - transferring the transaction layer packet from the second logical transaction layer to the first virtual channel; and
  - transmitting the transaction layer packet over a data link layer and a physical layer of the physical transport network using the virtual channel, the data link layer and the physical layer conforming to the first network protocol.

17. The system of claim 16, wherein the transaction layer packet includes a third party identifier recognizable to the first logical transaction layer, and a third party message type recognizable to the second logical transaction layer.

* * * * *